(12) United States Patent
Corson

(10) Patent No.: US 6,952,008 B2
(45) Date of Patent: Oct. 4, 2005

(54) FLUORESCENCE DETECTION WITH INCREASED DYNAMIC RANGE

(75) Inventor: John F. Corson, Stanford, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/934,313

(22) Filed: Sep. 2, 2004

(65) Prior Publication Data

US 2005/0072909 A1 Apr. 7, 2005

Related U.S. Application Data

(63) Continuation of application No. 10/160,605, filed on May 31, 2002, now Pat. No. 6,806,460.

(51) Int. Cl.[7] .................................................. G01J 3/50
(52) U.S. Cl. ........................ 250/226; 356/318; 356/417
(58) Field of Search .......................... 250/207, 214 VT, 250/226, 234–236, 458.1–461, 347, 349, 351; 356/318, 402, 416–419; 436/172

(56) References Cited

U.S. PATENT DOCUMENTS 6,141,096 A * 10/2000 Stern et al. .................. 356/318

* cited by examiner

*Primary Examiner*—Stephone B. Allen
*Assistant Examiner*—Patrick J. Lee

(57) ABSTRACT

The light detection system includes at least two light detection elements. Each element is responsive to a selected light color in a first mode, and each element has a different sensitivity and is responsive to a single color in a second mode for enhanced dynamic range. A preferred embodiment includes four light detectors for responding to four separate colors or for responding with enhanced dynamic range to two colors. Embodiments are disclosed using a mirror/beam splitter arrangement to switch between modes and an embodiment including dichroic filters serving as fractional beam splitters.

30 Claims, 4 Drawing Sheets

FLUORESCENCE DETECTION WITH INCREASED DYNAMIC RANGE

This is a Continuation of application Ser. No. 10/160, 605, filed on May 31, 2002, now U.S. Pat. No. 6,806,460 the entire disclosure of which is incorporated herein by reference.

BACKGROUND OF THE INVENTION

This invention relates to fluorescence detection, and more particularly, to a system capable of increased dynamic range and four-color detection.

Fluorescence readers are often used for re-sequencing or gene expression studies. In these systems, light such as that from a laser is directed onto a target, which may include molecules capable of fluorescing. Of course, the light could come from the process of chemi-luminescence as well. The emitted fluorescent light is then detected and analyzed. Oftentimes, multiple color dyes are utilized. For example, four colors may be used. The light is detected by florescence detection devices such as confocal scanning microscopes and imagers that utilize detection elements such as photo-multiplier tubes (PMTs), avalanche photo-diodes (APDs), and charge-coupled devices (CCDs).

Different users, or the same user performing different experiments, may require different operating modes of the detection equipment. If a particular slide employs four color dyes, then four separate detectors can be used to detect each of the four colors. If, however, there are only two dyes on a slide, the experimenter may wish increased dynamic range in the output with respect to the two dyes. Heretofore, two separate instruments would be required in order both to detect four separate colors or to detect two colors with a higher dynamic range. Alternatively, multiple scans would have had to be used with, for example, a two-color/two-detector instrument. See, U.S. Pat. No. 6,078,390. The present invention is directed to a single versatile instrument that can operate selectively in these two modes.

SUMMARY OF THE INVENTION

In one aspect, the light detection system of the invention includes at least two light detection elements with each element responsive to a selected light color in a first mode. In a second mode, each element has a different sensitivity within a dynamic range and each is responsive to the same single color.

In another aspect, the light detection system includes four light detection elements with each element responsive to a selected color when operated in a first mode. In a second mode, the four light detectors are grouped into two pairs of detection elements with each element in a pair having a different sensitivity from the other element in the pair for increased dynamic range for detection of a color. When operating in the second mode, it is preferred that one element has a sensitivity near the element's detection limit at the low end of a dynamic range and the other element has a sensitivity near the element's maximum non-saturating signal limit at the high end of the dynamic range. It is also preferred that there be overlap in the elements' sensitivities to cover a dynamic range continuously.

In preferred embodiments, the light detector includes photomultiplier tubes, charge-coupled devices and avalanche photo-diodes. When a photomultiplier tube or an avalanche photo-diode is used, the voltage is altered to adjust its sensitivity to either the low or high end of the dynamic range.

The system of the invention may include a moveable mirror/beam splitter arrangement to switch between the first and second modes or, alternatively, dichroic filters may serve as fractional beam splitters in another embodiment.

The instrument according to the invention can thus be used to detect multiple colors or to detect fewer colors with higher dynamic range. The instrument is entirely general and may be extended, for example, to 6 PMT's for 6 color detection or for 3 color detection with extra dynamic range. The invention also includes 4 PMT's, for example, for either 4 colors or 4 times more dynamic range for one color.

BRIEF DESCRIPTION OF THE DRAWING

Embodiments of the invention will now be described with reference to the drawings, in which.

DESCRIPTION OF THE PREFERRED EMBODIMENT

Figure 1:
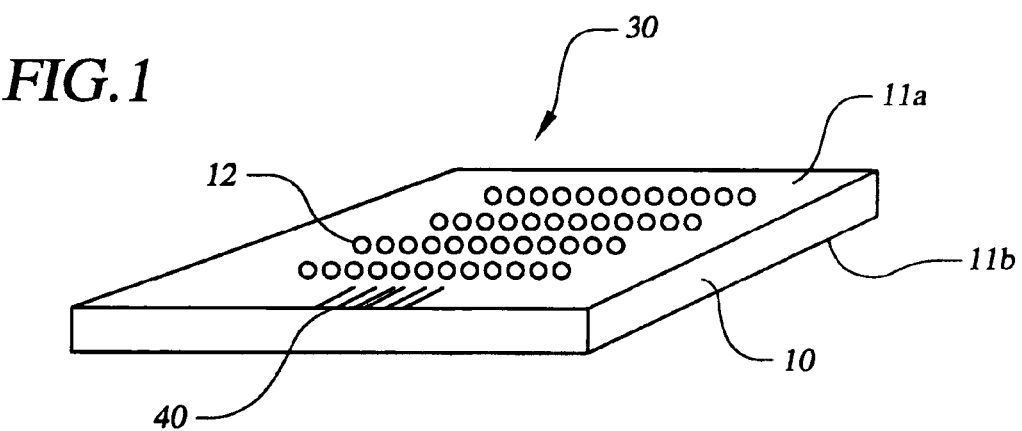
FIG. 1 is a perspective view of an array package including a substrate carrying a typical array, as may be used in the present invention.

In the present application, unless a contrary intention appears, the following terms refer to the indicated characteristics. A "biopolymer" is a polymer of one or more types of repeating units. Biopolymers are typically found in biological systems and particularly include polysaccharides (such as carbohydrates), and peptides (which term is used to include polypeptides and proteins) and polynucleotides as well as their analogs such as those compounds composed of a containing amino acid analogs or non-amino acid groups, or nucleotide analogs or non-nucleotide groups. This includes polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions. Polynucleotides include single or multiple stranded configurations, where one or more of the strands may or may not be completely aligned with another. A "nucleotide" refers to a sub-unit of a nucleic acid and has a phosphate group, a 5 carbon sugar and a nitrogen containing base, as well as functional analogs (whether synthetic or naturally occurring) of such sub-units which in the polymer form (as a polynucleotide) can hybridize with naturally occurring polynucleotides in a sequence specific manner analogous to that of two naturally occurring polynucleotides. For example, a "biopolymer" includes DNA (including cDNA), RNA, oligonucleotides, and PNA and other polynucleotides as described in U.S. Pat. No. 5,948,902 and references cited therein (all of which are incorporated herein by reference), regardless of the source. An "oligonucleotide" generally refers to a nucleotide multimer of about 10 to 100 nucleotides in length, while a "polynucleotide" includes a nucleotide multimer having any number of nucleotides. A "biomonomer" references a single unit, which can be linked with the same or other biomonomers to form a biopolymer (for example, a single amino acid or nucleotide with two linking groups one or both of which may have removable protecting groups). A biomonomer fluid or biopolymer fluid reference a liquid containing either a biomonomer or biopolymer, respectively (typically in solution).

An "array", unless a contrary intention appears, includes any one-, two- or three-dimensional arrangement of addressable regions bearing a particular chemical moiety or moieties (for example, biopolymers such as polynucleotide sequences) associated with that region. An array is "addressable" in that it has multiple regions of different moieties (for example, different polynucleotide sequences) such that a region (a "feature" or "spot" of the array) at a particular predetermined location (an "address") on the array will detect a particular target or class of targets (although a feature may incidentally detect non-targets of that feature). Array features are typically, but need to be, separated by intervening spaces. In the case of an array, the "target" will be referenced as a moiety in a mobile phase (typically fluid), to be detected by probes ("target probes") which are bound to the substrate at the various regions. However, either of the "target" or "target probes" may be the one which is to be evaluated by the other (thus, either one could be an unknown mixture of polynucleotides to be evaluated by binding with the other). An "array layout" refers to one or more characteristics of the features, such as feature positioning on the substrate, one or more feature dimensions, and an indication of a moiety at a given location. "Hybridizing" and "binding"; with respect to polynucleotides, are used interchangeably.

When one item is indicated as being "remote" from another, this referenced that the two items are at least in different buildings, and may be at least one mile, ten miles, or at least one hundred miles apart. "Communicating" information references transmitting the data representing that information as electrical signals over a suitable communication channel (for example, a private or public network). "Forwarding" an item refers to any means of getting that item from one location to the next, whether by physically transporting that item or otherwise (where that is possible) and includes, at least in the case of data, physically transporting a medium carrying the data or communicating the data. An array "package" may be the array plus only a substrate on which the array is deposited, although the package may include other features (such as a housing with a chamber). A "chamber" references an enclosed volume (although a chamber may be accessible through one or more ports). It will also be appreciated that throughout the present application, that words such as "top", "upper", and "lower" are used in a relative sense only. A "region" refers to any finite small area on the array that can be illuminated and any resulting fluorescence therefrom simultaneously (or shortly thereafter) detected, for example a pixel.

A "processor" references any hardware and/or software combination which will perform the functions required of it. For example, any processor herein may be a programmable digital microprocessor such as available in the form of a mainframe, server, or personal computer (desktop or portable). Where the processor is programmable, suitable programming can be communicated from a remote location to the processor, or previously saved in a computer program product (such as a portable or fixed computer readable storage medium, whether magnetic, optical or solid state device based). For example, a magnetic or optical disk may carry the programming, and can be read by a suitable disk reader communicating with each processor at its corresponding station. Reference to a singular item, includes the possibility that there are plural of the same items present. "May " means optionally. Methods recited herein may be carried out in any order of the recited events which is logically possible, as well as the recited order of events. All patents and other references cited in this application, are incorporated into this application by reference except insofar as they may conflict with those of the present application (in which case the present application prevails).

Figure 2:
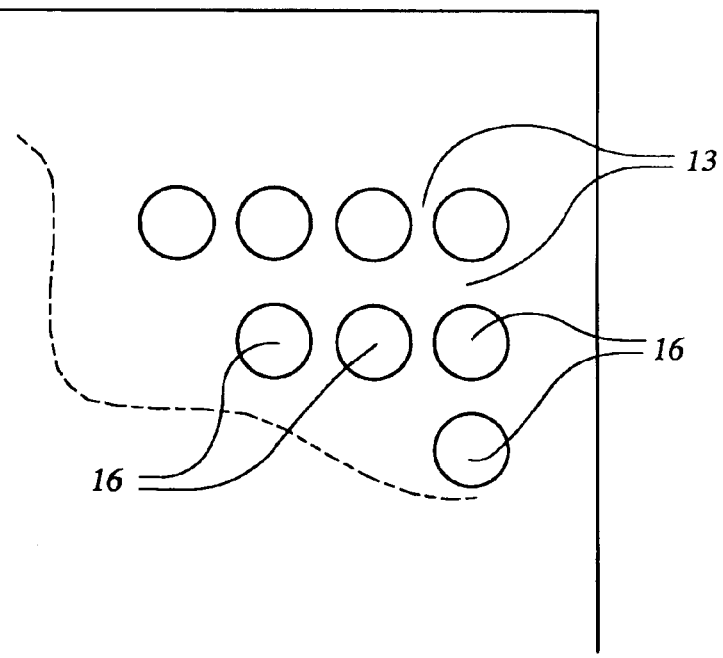
FIG. 2 is an enlarged view of a portion of FIG. 1 showing some of the identifiable individual regions of a single array of FIG. 1.
Figure 3:
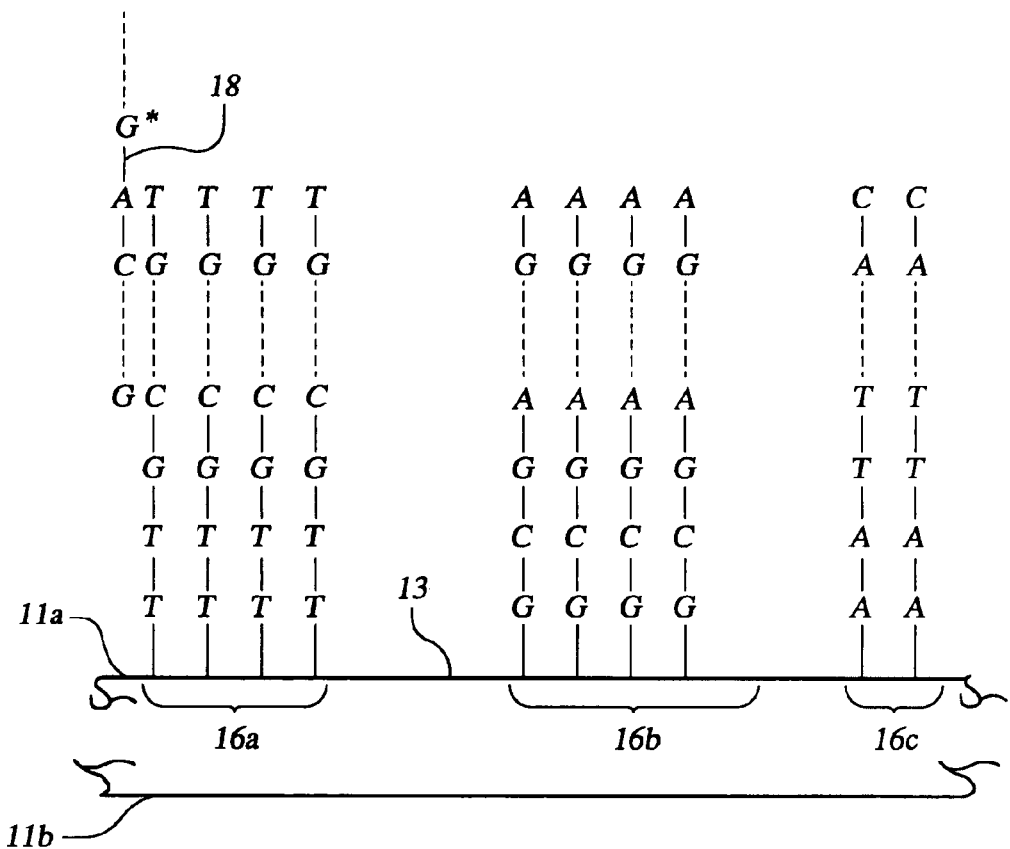
FIG. 3 is an enlarged cross-section of a portion of FIG. 2.

Referring first to FIGS. 1–3, a contiguous planar transparent substrate 10 carries multiple features 16 disposed across a first surface 11a of substrate 10 and separated by interfeature areas 13. Features 16 are disposed in a pattern which defines the array. A second surface 11b of substrate 10 does not carry any features. Substrate 10 may be of any shape although the remainder of any package carrying substrate 10, and the apparatus of the present invention, may need to be adapted accordingly. A typical array may contain at least ten features 16, or at least 100 features, at least 1,000, at least 100,000 features, or more. All of the features 16 may be of different composition, or some could be the same (for example, when any repeats of each feature composition are excluded the remaining features may account for at least 5%, 10%, or 20% of the total number of features). Each features carries probes in the form of a one moiety or mixture of moieties, which in the case of each feature 16 of FIGS. 1–3 is a polynucleotide having a particular sequence, while interfeature areas 13 do not carry any moieties of a type the same as the features 16 (for example, no polynucleotides in the case of features 16 carrying polynucleotides). This is illustrated schematically in FIG. 3 where regions 16 are shown as carrying different polynucleotide sequences. Features 16 may have widths (that is, diameter, for a round spot) of at least 5 or 10 $\mu$m, and less than 1.0 cm. In embodiments where very small spot sizes or feature sizes are desired, each of the features 16 may have widths of at least 1.0 $\mu$m and less than 1.0 mm, usually less than 500 $\mu$m, and more usually less than 200 $\mu$m. Features which are not round may be areas equivalent to the area ranges of round features 16 resulting from the foregoing diameter ranges. The probes of features 16 are typically linked to substrate 10 through a suitable linker, not shown.

The array 12 may cover an area of less than 100 cm$^2$, or even less than 50, 10 or 1 cm$^2$. In many embodiments, substrate 10 will be shaped generally as a rectangular solid (although other shapes are possible), having a length of more than 4 mm and less than 1 m, usually more than 4 mm and less than 600 mm, more usually less than 400 mm; a width of more than 4 mm and less than 1 m, usually less than 500 mm and more usually less than 400 mm; and a thickness of more than 0.01 mm and less than 5.0 mm, usually more than 0.1 mm and less than 2 mm and more usually more than 0.2 and less than 1 mm.

An array identifier 40 in the form of a bar code in FIG. 1, is associated with the array 12, by being provided on the same substrate 10 adjacent one of the arrays 12. In the case where more than one array 12 is present on the same substrate 10, a separate identifier can be provided adjacent each corresponding array 12 if desired. Identifier 40 may either contain information on the layout of array 12 or be linkable to a file containing such information in a manner such as described in U.S. Pat. No. 6,180,351. Each identifier 40 for different arrays may be unique so that a given identifier will likely only correspond to one array 12 or to arrays 12 on the same substrate 10. This can be accomplished by making identifier 40 sufficiently long and incrementing or otherwise varying it for different arrays 12 or arrays 12 on the same substrate 10, or even by selecting it to be globally unique in a manner in which globally unique identifiers are selected as described in U.S. Pat. No. 6,180,351.

Arrays such as those FIGS. 1–3 can be fabricated using drop deposition from pulse jets of either polynucleotide precursor units (such as monomers) in the case of in situ fabrication, or the previously obtained polynucleotide. Such methods are described in detail in, for example, the previously cited references including U.S. Pat. Nos. 6,242,266, 6,232,072, 6,180,351, 6,171,797, 6,323,043, U.S. patent application Ser. No. 09/302,898 filed Apr. 30, 1999 by Caren et al., and the references cited therein. As already mentioned, these references are incorporated herein by reference. Other drop deposition methods can be used for fabrication, as previously described herein. Also, instead of drop deposition methods, other array fabrication method may be used such as described in U.S. Pat. Nos. 5,599,695, 5,753,788, and 6,329,143. Interfeature areas 13 need not be present particularly when the arrays are made by light directed methods as described in those patents. In use, a feature can detect a polynucleotide of a complementary sequence by hybridizing to it, such as polynucleotide 18 being detected by feature 16a in FIG. 3 (the "*" on polynucleotide 18 indicating a label such as a fluorescent label). Use of arrays to detect particular moieties in a sample (such as target sequences) are well known. The layer thickness of the probes at features 16, together with any detected target to which they are bound, is often less than 500 nm thick, and often less than 200, 100, 50 or 20 nm in thickness.

Figure 4:
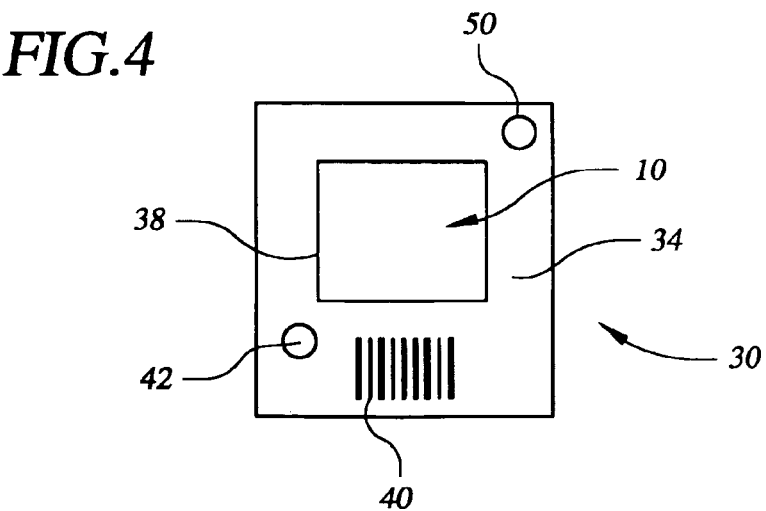
FIG. 4 is a front view of another array package in the form of a cartridge, which may be used in the present invention.

Referring now to FIG. 4 an array package 30 may include a housing 34 which has received substrate 10 adjacent an opening. Substrate 10 is sealed (such as by the use of a suitable adhesive) to housing 34 around a margin 38 with the second surface 11b facing outward. Housing 34 is configured such that housing 34 and substrate 10, define a chamber into which features 16 of array 12 face. This chamber is accessible through resilient septa 42, 50 which define normally closed ports of the chamber. In this case array package 30 may be associated with the identifier 40 by providing identifier 40 on housing 34. Throughout this application "association" of any these or other items with the array, can be accomplished, for example, by the items being present in the same package as the array when shipped to an end user.

The components of the embodiments of either array package 30 described above, may be made of any suitable material. For example, housing 34 can be made of metal or plastic such as polypropylene, polyethylene or acrylonitrile-butadiene-styrene ("ABS"). Substrate 10 may be of any suitable material, and is preferably sufficiently transparent to the wavelength of an interrogating and array emitted light, as to allow interrogation without removal from housing 34. Such transparent and non-transparent materials include, for flexible substrates: nylon, both modified and unmodified, nitrocellulose, polypropylene, and the like. For rigid substrates, specific materials of interest include: glass; fused silica, silicon, plastics (for example, polytetrafluoroethylene, polypropylene, polystyrene, polycarbonate, and blends thereof, and the like); metals (for example, gold, platinum, and the like). The first surface 11a of substrate 10 may be modified with one or more different layers of compounds that serve to modify the properties of the surface in a desirable manner. Such modification layers, when present, will generally range in thickness from a monomolecular thickness to about 1 mm, usually from a monomolecular thickness to about 0.1 mm and more usually from a monomolecular thickness to about 0.001 mm. Modification layers of interest include: inorganic and organic layers such as metals, metal oxides, polymers, small organic molecules and the like. Polymeric layers of interest include layers of: peptides, proteins, polynucleic acids or mimetics thereof (for example, peptide nucleic acids and the like); polysaccharides, phospholipids, polyurethanes, polyesters, polycarbonates, polyureas, polyamides, polyethyleneamines, polyarylene sulfides, polysiloxanes, polyimides, polyacetates, and the like, where the polymers may be hetero- or homopolymeric, and may or may not have separate functional moieties attached thereto (for example, conjugated), The materials from which substrate 10 and housing 34 (at least the portion facing toward the inside of chamber 36) may be fabricated should ideally themselves exhibit a low level of binding during hybridization or other events.

Figure 5:
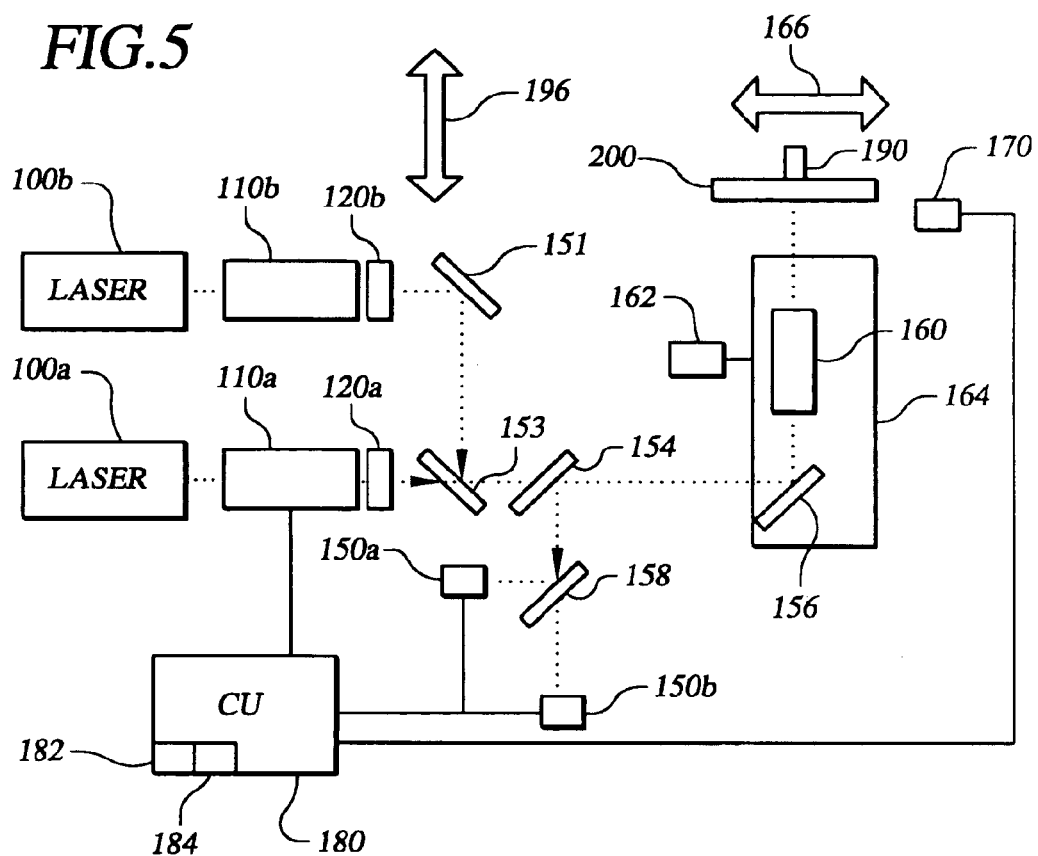
FIG. 5 schematically illustrates an apparatus of the present invention.

Referring now to FIG. 5, an apparatus of the present invention (which may be generally referenced as an array "scanner") is illustrated. A light system provides light from a laser 100 which passes through an electro-optic modulator (EOM) 110 with attached polarizer 120. Each laser 100a, 100b may be of different wavelength (for example, one providing red red light and the other green) and each has its own corresponding EOM 110a, 110b and polarizer 120a, 120b. The beams may be combined along a path toward a holder 200 by the use of full mirror 151 and dichroic mirror 153. A control signal in the form of a variable voltage applied to each corresponding EOM 110a, 110b by the controller (CU) 180, changes the polarization of the exiting light which is thus more or less attenuated by the corresponding polarizer 120a, 120b. Controller 180 may be or include a suitably programmed processor. Thus, each EOM 110 and corresponding polarizer 120 together act as a variable optical attenuator which can alter the power of an interrogating light spot exiting from the attenuator. The remainder of the light from both lasers 100a, 100b is transmitted through a dichroic beam splitter 154, reflected off fully reflecting mirror 156 and focused onto either an array 12 of an array package 30 mounted on holder 200, or a calibration member (not shown), whichever is at a reading position, using optical components in beam focuser 160. Light emitted, in particular fluorescence, at two different wavelengths (for example, green and red light) from features 16, in response to the interrogating light, is imaged using the same optics in focuser/scanner 160, and is reflected off mirrors 156 and 154. The two different wavelengths are separated by a further dichroic mirror 158 and are passed to respective detectors 150a and 150b. More optical components (not shown) may be used between the dichroic and each detector 150a, 150b (such as lenses, pinholes, filters, fibers etc.) and each detector 150a, 150b may be of various different types (e.g. a photo-multiplier tube (PMT) or a CCD or an avalanche photodiode (APD)). All of the optical components through which light emitted from an array 12 or a calibration member in response to the illuminating laser light, passes to detectors 150a, 150b, together with those detectors, form a detection system. This detection system has a fixed focal plane.

A scan system causes the illuminating region in the form of a light spot from each laser 100*a*, 100*b*, and a detecting region of each detector 150*a*, 150*b* (which detecting region will form a pixel in the detected image), to be scanned across multiple regions of an array package 30 mounted on holder 200. The scanned regions for an array 12 will include at least the multiple features 16 of the array. In particular the scanning system is typically a line by line scanner, scanning the interrogating light in a line across an array 12 when at the reading position, in a direction of arrow 166, then moving ("transitioning") the interrogating light in a direction into/out of the paper as viewed in FIG. 5 to a position at an end of a next line, and repeating the line scanning and transitioning until the entire array 12 has been scanned. This can be accomplished by providing a housing 164 containing mirror 158 and focuser 160, which housing 164 can be moved along a line of pixels (that is, from left to right or the reverse as viewed in FIG. 5) by a transporter 162. The second direction 192 of scanning (line transitioning) can be provided by second transporter which may include a motor and belt (not shown) to move holder 200 along one or more tracks. The second transporter may use a same or different actuator components to accomplish coarse (a larger number of lines) movement and finer movement (a smaller number of lines). The reader of FIG. 5 may further include a reader (not shown) which reads an identifier 40 from an array package 30. When identifier 40 is in the form of a bar code, that reader may be a suitable bar code reader.

An autofocus detector 170 is also provided to sense any offset between different regions of array 12 when in the reading position, and a determined position of the focal plane of the detection system. An autofocus system includes detector 170, processor 180, and a motorized adjuster 190 to move holder in the direction of arrow 196. A suitable chemical array autofocus system is described in pending U.S. patent application Ser. No. 09/415,184 for "Apparatus And Method For Autofocus" by Dorsel et al., filed Oct. 7, 1999, incorporated herein by reference, as well as European publication EP 1091229 published Apr. 11, 2001 under the same title and inventors.

Controller 180 of the apparatus is connected to receive signals from detectors 150*a*, 150*b*, (these different signals being different "channels"), namely a signal which results at each of the multiple detected wavelengths from emitted light for each scanned region of array 12 when at the reading position mounted in holder 200. Controller 180 also receives the signal from autofocus offset detector 170, and provides the control signal to EOM 110, and controls the scan system. Controller 180 may also analyze, store, and/or output data relating to emitted signals received from detectors 150*a*, 150*b* in a known manner. Controller 180 may include a computer in the form of a programmable digital processor, and include a media reader 182 which can read a portable removable media (such as a magnetic or optical disk), and a communication module 184 which can communicate over a communication channel (such as a network, for example the internet or a telephone network) with a remote site (such as a database at which information relating to array package 30 may be stored in association with the identification 40). Controller 180 is suitably programmed to execute all of the steps required by it during operation of the apparatus, as discussed further below. Alternatively, controller 180 may be any hardware or hardware/software combination which can execute those steps.

In one mode of operation, the array in package 30 is typically first exposed to a liquid sample (for example, placed directly on substrate 10 or introduced into a chamber through one of the septa 42, 50). The array may then be washed and scanned with a liquid (such as a buffer solution) present in the chamber and in contact with the array, or it may be dried following washing. Following a given array package 30 being mounted in the apparatus, the identifier reader may automatically (or upon operator command) read array ID 40, and use this to retrieve information on the array layout. Such information may be retrieved directly from the contents of identifier 40 when ID 40 contains such information. Alternatively, identifier 40 may be used to retrieve such information from database containing the identifier in association with such information. Such a database may be a local database accessible by controller 180 (such as may be contained in a portable storage medium in drive 182 which is associated with package 30, such as by physical association with package 30 when received by the user, or by a suitable identification), or may be a remote database accessible by controller 180 through communication module 184 and a suitable communication channel (not shown).

The saved results from a sample exposed array, read according to a method of the present invention, may be raw results (such as fluorescence intensity readings for each feature in one or more color channels) or may be processed results such as obtained by rejecting a reading for a feature which is below a predetermined threshold and/or forming conclusions based on the pattern read from the array (such as whether or not a particular target sequence may have been present in the sample). The results of the reading (processed or not) may be forwarded (such as by communication of data representing the results) to a remote location if desired, and received there for further use (such as further processing).

Note that a variety of geometries of the features 16 may be constructed other than the organized rows and columns of the array of FIGS. 1–3. For example, features 16 can be arranged in a series of curvilinear rows across the substrate surface (for example, a series of concentric circles or semicircles of spots), and the like. Even irregular arrangements of features 16 can be used, at least when some means is provided such that during their use the locations of regions of particular characteristics can be determined (for example, a map of the regions is provided to the end user with the array). Furthermore, substrate 10 could carry more than one array 12, arranged in any desired configuration on substrate 10. While substrate 10 is planar and rectangular in form, other shapes could be used with housing 34 being adjusted accordingly. In many embodiments, substrate 10 will be shaped generally as a planar, rectangular solid, having a length in the range about 4 mm to 200 mm, usually about 4 mm to 150 mm, more usually about 4 mm to 125 mm; a width in the range about 4 mm to 200 mm, usually about 4 mm to 120 mm and more usually about 4 mm to 80 mm; and a thickness in the range about 0.01 mm to 5.0 mm, usually from about 0.1 mm to 2 mm and more usually from about 0.2 to 1 mm. However, larger substrates can be used. Less preferably, substrate 10 could have three-dimensional shape with irregularities in first surface 11*a*. In any event, the dimensions of housing 34 may be adjusted accordingly. Additionally, during scanning it is possible to illuminate all pixels of a line simultaneously (for example, by using a line of light emitting diodes).

Figure 6:
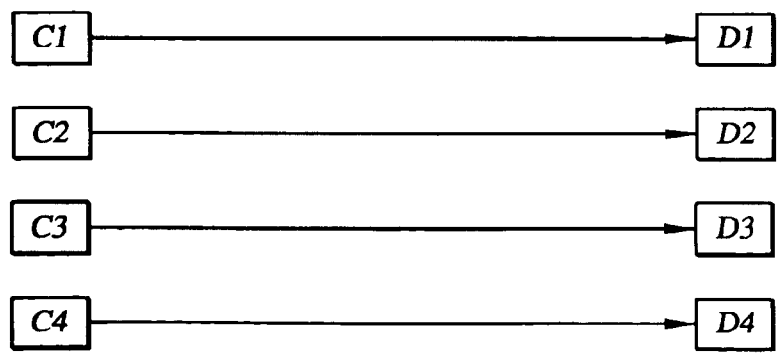
FIG. 6 is a schematic illustration of a first mode of operation of the instrument of the invention.
Figure 7:
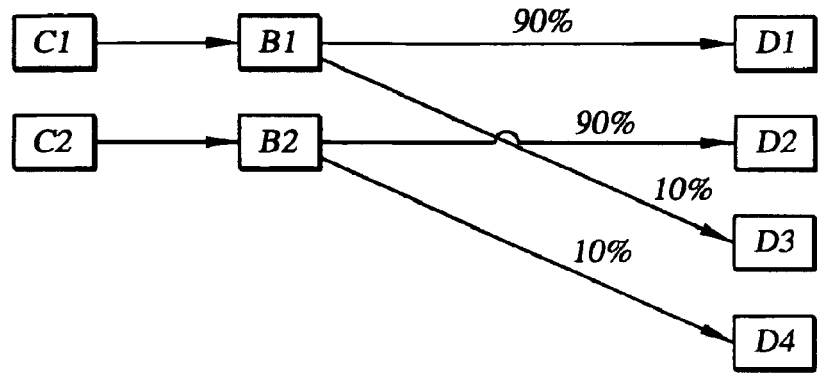
FIG. 7 is a schematic illustration of an embodiment of the invention utilizing beam splitters.

A preferred embodiment of the invention is a fluorescence detection device (confocal scanning microscope, imager, etc.) that uses four detection elements (PMTs, APDs, CCDs, etc.) in order to gain both increased dynamic range and four color detection. As shown in FIG. 6, if one wishes to use the device of the invention for four color detection, then the device will use one detection element for each of four colors of emitted light. As shown in FIG. 6, colors C1–C4 will be detected by detectors D1–D4 respectively. Each of the detectors D1–D4 is tuned to the correct wavelength, either internally or with external filtering of the light traveling to the detectors. On the other hand, if the user wishes extra dynamic range (ratio of maximum non-saturating signal to minimum signal detectable with a given level of confidence) for an experiment using only two detected colors, the device will be configured to use two detectors for each of the two colors of emitted light. This mode of operation is illustrated in FIG. 7 for detecting two colors C1 and C2 with enhanced dynamic range. For each color, the instrument will use one detector for the low end of the dynamic range (signals near the detection limit) and the other detector for the high end of the dynamic range (signals near the maximum non-saturating signal). By providing some overlap between the dynamic ranges of the low detector and high detector, the two detectors can be calibrated and the entire dynamic range continuously covered. The instrument disclosed herein can be calibrated such that the characteristics of the overlap between the detectors is known for each mode of operation and color spectrum. The system then can automatically combine the data from the two detectors (with different dynamic ranges) into one set of data. Before the data from the two detectors can be combined into one data file the system of the invention must account for the differences in sensitivity (also called scale factor—the amount of signal from the detector given a certain density of fluorescent molecules on the sample). For instance, assume 10% of the light from a given color channel goes into one detector (D1) and 90% of the light goes into a second detector (D2), then the signal from D1 should be scaled so that it has the same scale factor as D2. In this example, this scaling can be done my multiplying the signal from D1 by a factor of 9 (90%/10%=9). If different dynamic ranges in the two detectors are achieved by altering PMT voltage rather than providing different amounts of light, the equalization must still be performed, but the details will differ in a manner obvious to one skilled in this art. Once this equalizing of scale factors has been done, the data sets from D1 and D2 can be combined into a single data set.

In the range where the individual detectors' dynamic ranges overlap, the signal can be the average of the two (accounting, of course, for the difference between the sensitivities of the detectors). Above and below the overlap range, the data will come solely from one detector or another. In the overlap range, the data from the two detectors can be filtered to reject data that seems spurious. This filtering can be done on an area-by-area or data point-by-data point basis using some method of rejecting data on a statistical basis.

It is contemplated that the instrument of the invention will allow the user the option to decide how much overlap there should be between the two detectors. This flexibility can be done by altering PMT voltages and/or providing variable attenuators. If the user chooses more overlap, there will be a larger region in which to average the data from the two detectors and more reliable knitting together of data from the two detectors. If less overlap is selected, a larger dynamic range will result. A calibration of the instrument can also be performed to determine the extent of the overlap region for each pair of detectors for all color spectra supported and for all sensitivity levels allowed and for all amounts of overlap allowed between the individual dynamic ranges of the two detectors.

The instrument can be switched back and forth between the two operating regimes, either automatically or at the user's command. Those skilled in the art will recognize that there are many ways to perform the change between the two modes and two ways will be discussed below.

With reference again to FIG. 7, light color C1 passes through beam splitter B1 so that 90%, for example, of the light travels to detector D1 and the remaining 10% of the light impinges upon detector D3. Similarly, light of color C2 passes through beam splitter B2 with 90% of the light falling on detector D2 and 10% falling on detector D4. The sensitivity of detector D1 is selected so that it will respond to signals that are out of range (either too large or too small) to be seen by detector D3. The sensitivities of detectors D2 and D4 are selected similarly. If the detectors D1–D4 are PMTs, for example, then the bias voltages are adjusted so that one of the detectors of a pair will be operating near the detection limit and the other will be able to see larger signals without saturation providing still for overlap in their individual dynamic ranges. This PMT voltage adjustment approach can be utilized whether the amount of light hitting each detector is equal or not.

There are many hardware switches to enable changing from the mode shown FIG. 6 to that shown in FIG. 7. For example, there could be mirrors (not shown) present in the four color mode of FIG. 6 that send color C3 to detector D3 and color C4 to detector D4. In the increased dynamic range mode, such mirrors would be removed from the beam path and only colors C1 and C2 are utilized.

Figure 8:
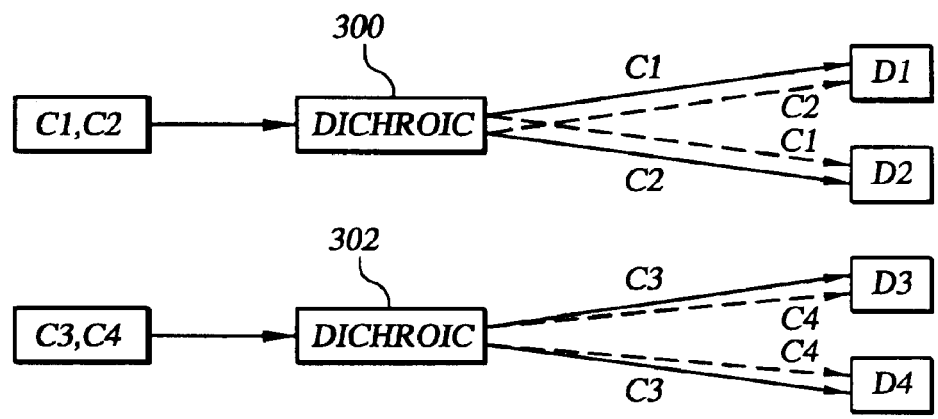
FIG. 8 is a schematic illustration of an embodiment of the invention employing dichroic filters.
Figure 9:
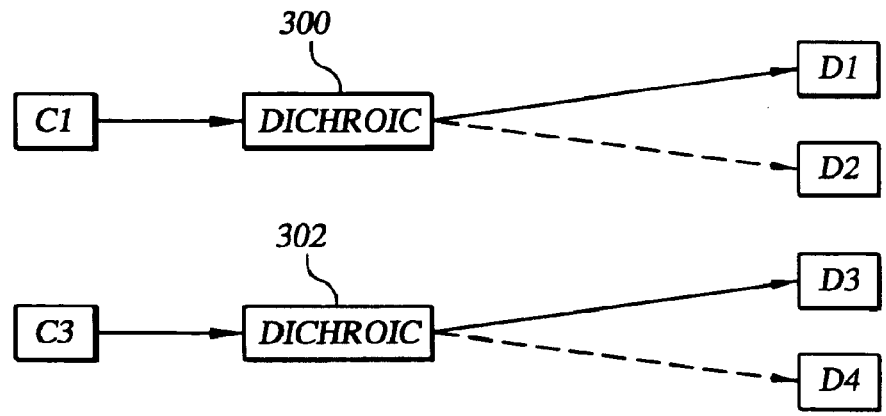
FIG. 9 is a schematic illustration of the invention utilizing dichroic filters for enhanced dynamic range.

Another embodiment of the invention is illustrated in FIGS. 8 and 9. Let's assume that colors C1 and C2 are spectrally close and colors C3 and C4 are also spectrally close. We will also assume that C1 and C2 are spectrally far from C3 and C4 relative to the spacing of C1 and C2. Further, assume that C1 and C2 are collected at the same point and travel along the same light path. Similarly, we assume that color C3 and color C4 are collected at the same point and travel along the same light path. A dichroic filter 300 separates C1 from C2 and a dichroic filter 302 separates C3 from C4. Since the dichroic filter 300 and 302 cannot perfectly split C1 from C2 or C3 from C4, there will be some C2 reaching D1 and vice-versa.

The four color mode is illustrated in FIG. 8. As shown in FIG. 9, the dichroic filters 300 and 312 can be used in an enhanced dynamic range mode for detecting only two colors C1 and C3. In this case, a majority of light C1 goes to detector D1 with a fraction going to detector D2. Similarly, color C3 will be split between detector D3 and detector D4. In this case, the dichroic filters 300 and 302 serve as fractional beam splitters. In this case, D2 is adapted to be the high signal detector for C1 and D4 would be the high signal detector for C3. The arrangement in FIG. 9 does not require any hardware switching, but can be done in software. It should be apparent that the dichroics separate the colors when operating in the extra-color mode (four colors with four detectors) and divide the light (equally or unequally) from one color to be received by two detectors when in the extra dynamic range mode.

It is thus seen that the instrument of the invention is highly versatile in its ability to operate in two different modes. It is recognized that modifications and variations of the invention will be apparent to those skilled in the art, and it is intended that all such modifications and variations be included within the scope of the appended claims.

What is claimed is:

1. A method of scanning a surface of a substrate, said method comprising:
   (a) placing said substrate in an array scanner having a light detection system comprising at least two light detection elements, each element responsive to a selected light color in a first mode, and each element having a different sensitivity within a dynamic range and responsive to a single color in a second mode; and (b) scanning a surface of said substrate placed in said array scanner with said light detection system.

2. The method of claim 1, wherein said method further comprises selecting said first mode or said second mode.

3. The method of claim 2, wherein in the second mode, one element has a sensitivity near the element's detection limit, and the other element has a sensitivity near the element's maximum non-saturating signal limit.

4. The method of claim 3, wherein there is overlap in the elements' sensitivities to cover continuously a dynamic range.

5. The method of claim 1, wherein the light detector is a photomultiplier tube.

6. The method of claim 1, wherein the light detector is an APD.

7. The method of claim 1, wherein the light detector is a charge-coupled device.

8. The method of claim 5, wherein said method comprises altering a bias voltage of said photomultiplier tube.

9. The method of claim 1, further comprising combining data for the same color from two different detectors into one data file with different but overlapping dynamic ranges.

10. The method of claim 9, wherein said combining comprises using a data-combining algorithm.

11. The method of claim 10, wherein the algorithm rejects data in the overlap region based on a statistical method identifying spurious results or outliers on an area-by-area or data point-by-data point bases.

12. The method of claim 4, further comprising selecting how much overlap to allow between the two detectors.

13. The method of claim 12, wherein said selecting comprises at least one of; altering PMT voltages and providing variable attenuators.

14. The method of claim 1, wherein said substrate is an array.

15. The method of claim 14, wherein said method comprises contacting said surface of said array with a sample prior to placing said array in said scanner.

16. A method of scanning a surface of a substrate, said method comprising:

(a) placing said substrate in an array scanner comprising a light detection system comprising four light detection elements, each element responsive to a selected color in a first mode; and in a second mode, the four light detectors are grouped in two pairs of detection elements, each element in a pair having a different sensitivity from the other element in the pair for increased dynamic range for detection of a color; and (b) scanning a surface of said substrate placed in said array scanner with said light detection system.

17. The method of claim 16, wherein said method further comprises selecting said first mode or said second mode.

18. The method of claim 17, wherein in the second mode, one element has a sensitivity near the element's detection limit, and the other element has a sensitivity near the element's maximum non-saturating signal limit.

19. The method of claim 18, wherein there is overlap in the elements' sensitivities to cover continuously a dynamic range.

20. The method of claim 16, wherein the light detector is a photomultiplier tube.

21. The method of claim 16, wherein the light detector is an APD.

22. The method of claim 16, wherein the light detector is a charge-coupled device.

23. The method of claim 20, wherein said method comprises altering a bias voltage of said photomultiplier tube.

24. The method of claim 16, further comprising combining data for the same color from two different detectors into one data file with different but overlapping dynamic ranges.

25. The method of claim 24, wherein said combining comprises using a data-combining algorithm.

26. The method of claim 25, wherein the algorithm rejects data in the overlap region based on a statistical method identifying spurious results or outliers on an area-by-area or data point-by-data point bases.

27. The method of claim 19, further comprising selecting how much overlap to allow between the two detectors.

28. The method of claim 27, wherein said selecting comprises at least one of altering PMT voltages and providing variable attenuators.

29. The method of claim 16, wherein said substrate is an array.

30. The method of claim 29, wherein said method comprises contacting said surface of said array with a sample prior to placing said array in said scanner.

* * * * *